United States Patent
Das Kumar et al.

(10) Patent No.: US 11,912,838 B2
(45) Date of Patent: Feb. 27, 2024

(54) POLYETHYLENE COMPOSITION FOR FILM APPLICATIONS

(71) Applicants: ABU DHABI POLYMERS CO. LTD. (BOROUGE) L.L.C, Abu Dhabi (AE); BOREALIS AG, Vienna (AT)

(72) Inventors: Subrata Das Kumar, Abu Dhabi (AE); Ashish Kumar, Abu Dhabi (AE); Shawn Khoo, Abu Dhabi (AE); Raghvendra Singh, Abu Dhabi (AE); Niraj Dixit, Abu Dhabi (AE)

(73) Assignees: BOREALIS AG, Vienna (AT); ABU DHABI POLYMERS CO. LTD. (BOROUGE) L.L.C., Abu Dhabi (AE)

( * ) Notice: Subject to any disclaimer, the term of this patent is extended or adjusted under 35 U.S.C. 154(b) by 335 days.

(21) Appl. No.: 17/292,880

(22) PCT Filed: Nov. 26, 2019

(86) PCT No.: PCT/EP2019/082540
§ 371 (c)(1),
(2) Date: May 11, 2021

(87) PCT Pub. No.: WO2020/109289
PCT Pub. Date: Jun. 4, 2020

(65) Prior Publication Data
US 2021/0403657 A1 Dec. 30, 2021

(30) Foreign Application Priority Data
Nov. 28, 2018 (EP) ..................................... 18208908

(51) Int. Cl.
*C08F 110/02* (2006.01)
*C08F 210/02* (2006.01)
(Continued)

(52) U.S. Cl.
CPC ............... *C08J 5/18* (2013.01); *C08F 110/02* (2013.01); *C08F 210/02* (2013.01);
(Continued)

(58) Field of Classification Search
None
See application file for complete search history.

(56) References Cited

U.S. PATENT DOCUMENTS 3,242,150 A 3/1966 Scoggin
3,324,093 A 6/1967 Alleman
(Continued)

FOREIGN PATENT DOCUMENTS

CA 2637448 A 7/2007
EP 0188125 A2 7/1986
(Continued)

OTHER PUBLICATIONS

Japanese Patent Application No. 2021-523292; Notice of Reasons for Rejection; dated Apr. 26, 2022; 5 pgs.
(Continued)

*Primary Examiner* — Richard A Huhn
(74) *Attorney, Agent, or Firm* — TAROLLI, SUNDHEIM, COVELL & TUMMINO L.L.P.

(57) ABSTRACT

The present invention relates to a polyethylene composition comprising a base resin comprising a low molecular weight ethylene polymer component and a high molecular weight ethylene polymer component, wherein the high molecular weight ethylene polymer component has a higher weight average molecular weight than the low molecular weight ethylene polymer component, wherein the base resin has a density of at least 958.0 kg/m$^3$, and the polyethylene composition a melt flow rate MFR$_2$ (190° C., 2.16 kg) of from 0.50 to 0.80 g/10 min and a molecular weight distribution being the ratio of the weight average molecular weight and
(Continued)

the number average molecular weight, Mw/Mn, of from 10.0 to 15.0, a process for producing said polyethylene composition, an article comprising said polyethylene composition and the use of said polyethylene composition for the production of a film.

16 Claims, 1 Drawing Sheet

(51) Int. Cl.
    *C08J 5/18*           (2006.01)
    *C08F 297/08*      (2006.01)
    *C08L 23/06*       (2006.01)
    *C08L 23/08*       (2006.01)
    *C08F 210/08*      (2006.01)
    *C08F 210/16*      (2006.01)

(52) U.S. Cl.
    CPC .......... *C08F 210/08* (2013.01); *C08F 210/16* (2013.01); *C08F 297/083* (2013.01); *C08L 23/06* (2013.01); *C08L 23/0815* (2013.01); *C08J 2353/00* (2013.01)

(56) References Cited

U.S. PATENT DOCUMENTS

| | | |
|---|---|---|
| 3,374,211 A | 3/1968 | Marwil et al. |
| 3,405,109 A | 10/1968 | Rohlfing |
| 4,532,311 A | 7/1985 | Fulks et al. |
| 4,543,399 A | 9/1985 | Jenkins, III et al. |
| 4,578,879 A | 4/1986 | Yokoyama et al. |
| 4,582,816 A | 4/1986 | Miro |
| 4,621,952 A | 11/1986 | Aronson |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 6,346,576 B1 | 2/2002 | Takahashi |
| 2015/0025455 A1 | 1/2015 | Shetty et al. |
| 2015/0259444 A1 | 9/2015 | Rohatgi et al. |

FOREIGN PATENT DOCUMENTS

| | | |
|---|---|---|
| EP | 0250169 A2 | 12/1987 |
| EP | 0479186 A2 | 4/1992 |
| EP | 0560035 A1 | 9/1993 |
| EP | 0579426 A1 | 1/1994 |
| EP | 0600414 A1 | 6/1994 |
| EP | 0688794 A1 | 12/1995 |
| EP | 0721798 A2 | 7/1996 |
| EP | 0699213 B1 | 2/1998 |
| EP | 0684871 B1 | 5/1998 |
| EP | 0891990 A2 | 1/1999 |
| EP | 0696293 B1 | 5/2000 |
| EP | 1310295 A1 | 5/2003 |
| EP | 1378528 A1 | 1/2004 |
| EP | 1415999 A1 | 5/2004 |
| EP | 1591460 A1 | 11/2005 |
| EP | 2799456 A1 | 11/2014 |
| JP | 2014-208750 A | 11/2014 |
| JP | 2017186515 A | 10/2017 |
| JP | 2017186515 A * | 10/2017 |
| WO | 1994/25495 A1 | 11/1994 |
| WO | 2000/29452 A1 | 5/2000 |
| WO | 2001/055230 A1 | 8/2001 |
| WO | 2005/087261 A2 | 9/2005 |
| WO | 2007/025640 A1 | 3/2007 |
| WO | 2009085922 A1 | 7/2009 |
| WO | 2011057924 A1 | 5/2011 |

OTHER PUBLICATIONS

Applicant: Abu Dhabi Polymers Co. Ltd LLC.; "Polyethylene Composition for Film Applications"; European U.S. Appl. No. 18/208,908; Extended European Search Report; dated May 21, 2019; 6 pgs.

Egyptian Application No. PCT 692/2021, Office Action dated Jun. 20, 2023.

United Arab Emirates Application No. P6000731/2021, Office Action Summary Examination Results, dated Aug. 21, 2023.

United Arab Emirates Application No. P6000731/20201, Search Report, dated Aug. 21, 2023.

* cited by examiner

POLYETHYLENE COMPOSITION FOR FILM APPLICATIONS

The present invention relates to a polyethylene composition having a melt flow rate $MFR_2$ of from 0.50 to 0.80 g/10 min and a molecular weight distribution Mw/Mn of 10.0 to 15.0 comprising a base resin with a density of at least 958 kg/m³, a process for producing said polyethylene composition, an article comprising said polyethylene composition and the use of said polyethylene composition for the production of a film.

BACKGROUND ART

General trends in packaging are downgauging with superior stiffness and toughness to get balanced properties required for packaging integrity at higher packaging speed. To improve stiffness, density of packaging materials needs to be high, hence higher density medium and high density polyethylene (MDPE and HDPE) products are being used more and more in the packaging applications. Another key aspect of latest advanced packaging is superior barrier performance and hence multilayer structure in which different polymers can be coextruded with different layer(s) are commonly used for various packaging. The enhanced barrier properties would enable to increase shelf life of packed goods and drives to use of HDPE for its lower water vapor transmission rate (WVTR) and oxygen transmission rate (OTR) in the packaging structures.

Apart from high stiffness, toughness and barrier requirements in packaging applications, another key requirements is environmental stress crack resistance (ESCR), which is required to pack different liquids in lamitubes or stand up pouches including toothpaste, cosmetics and other healthcare goods. There is an increasing need of HDPE materials with a high stiffness and high ESCR (i.e. a superior ESCR-stiffness balance) which is not easily available in the market. Therefore, the recent inventive grade development was focused to have improved ESCR with high stiffness and barrier HDPE which can be utilized in various packaging applications. In addition, good processability and lower gels of HDPE are also very important criteria to fulfil multilayer film processing requirements in coextrusion with other LLDPE, MDPE, m-LLDPE and LDPE materials.

WO 2009/085922 A1 discloses polyethylene resins suitable for blown film applications with a broad spectrum of properties. The high density polyethylene compositions show a good ESCR-stiffness balance but should have a rather poor processability shown in their low melt flow rates for blown film in multilayer packaging.

US 2015/0259444 A1 discloses polyethylene resins suitable for blow molding applications with good ESCR properties. The compositions show rather high zero shear viscosities and high molecular weights indicating rather poor processabilities for blown film in multilayer packaging.

US 2015/0259455 A1 discloses polyethylene resins suitable for blow molding applications with good ESCR properties. The compositions show rather low melt flow rates and high molecular weights indicating rather poor processabilities for blown film in multilayer packaging.

Thus, there is still a need in the art for polyethylene compositions with a high density base resin suitable for packaging applications which show an improved balance of properties as regards high stiffness, high ESCR, good processability, low gel content, and enhanced barrier properties especially in WVTR and OTR.

SUMMARY OF THE INVENTION

The present invention relates to a polyethylene composition comprising a base resin comprising
a low molecular weight ethylene polymer component and a high molecular weight ethylene polymer component, wherein the high molecular weight ethylene polymer component has a higher weight average molecular weight than the low molecular weight ethylene polymer component,
wherein the base resin has a density of at least 958.0 kg/m³, and the polyethylene composition a melt flow rate $MFR_2$ (190° C., 2.16 kg) of from 0.50 to 0.80 g/10 min and a molecular weight distribution being the ratio of the weight average molecular weight and the number average molecular weight, Mw/Mn, of from 10.0 to 15.0.

Further, the invention relates to a process for producing a polyethylene composition as defined above or below comprising the steps of:
a) polymerizing ethylene in the presence of a polymerization catalyst in a first polymerization reactor for producing a first intermediate material comprising the low molecular weight ethylene polymer component;
b) transferring the first intermediate material into a second polymerization reactor;
c) polymerizing ethylene and at least one comonomer selected from alpha-olefins having from 4 to 8 carbon atoms in the presence of the first intermediate material for producing a base resin comprising the low molecular weight ethylene polymer component and the high molecular weight ethylene polymer component;
d) compounding the base resin to obtain the polyethylene composition.

Still further, the invention relates to an article comprising the polyethylene composition as defined above or below.

Finally, the invention relates to the use of the polyethylene composition as defined above or below for the production of a film.

Definitions

A polyethylene composition according to the present invention denotes a composition comprising one or more polymers, wherein the molar amounts of the components of the polymer composition add up to a total amount of at least 50 mol-% ethylene monomer units.

The term 'base resin' denotes the polymeric part of the polyethylene composition without usual additives for utilization with polyolefins, such as stabilizers (e.g. antioxidant agents), antacids and/or anti-UV's, may be present in the polyethylene composition. Preferably, the total amount of these additives is 1.0 wt % or below, more preferably 0.5 wt % or below, most preferably 0.25 wt % or below, of the composition.

An 'ethylene homopolymer' denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

A polymer is denoted 'ethylene copolymer' if the polymer is derived from ethylene monomer units and at least one alpha-olefin comonomer. The alpha-olefin conomoner preferably is selected from alpha-olefin conomoners with 4 to 8 carbon atoms, more preferably 4 to 6 carbon atoms. Suitable alpha-olefin comonomer species are 1-butene, 1-hexene, 4-methyl-1-pentene, 1-octene or their mixtures. Preferred are 1-butene and 1-hexene.

A polyethylene composition or base resin comprising more than one fraction differing from each other in at least one property, such as weight average molecular weight or comonomer content, is called "multimodal". If the multimodal polyethylene composition or base resin includes two different fractions, it is called "bimodal" and, correspondingly, if it includes three different fractions, it is called "trimodal". The form of the molecular weight distribution curve, i.e. the appearance of the graph of the polymer weight fraction as function of its molecular weight, of such a multimodal polyethylene composition or base resin will show two or more maxima depending on the modality or at least be distinctly broadened in comparison with the curves of the individual fractions.

All rheological measurements can be performed with the base resin and with the polyethylene composition. As a matter of definition, all rheological properties shall preferably also apply to the polyethylene composition.

The amounts disclosed in herein relate to weight amounts in % by weight or wt %, if not stated otherwise.

FIGURES

DETAILED DESCRIPTION

Base Resin

Figure 1:
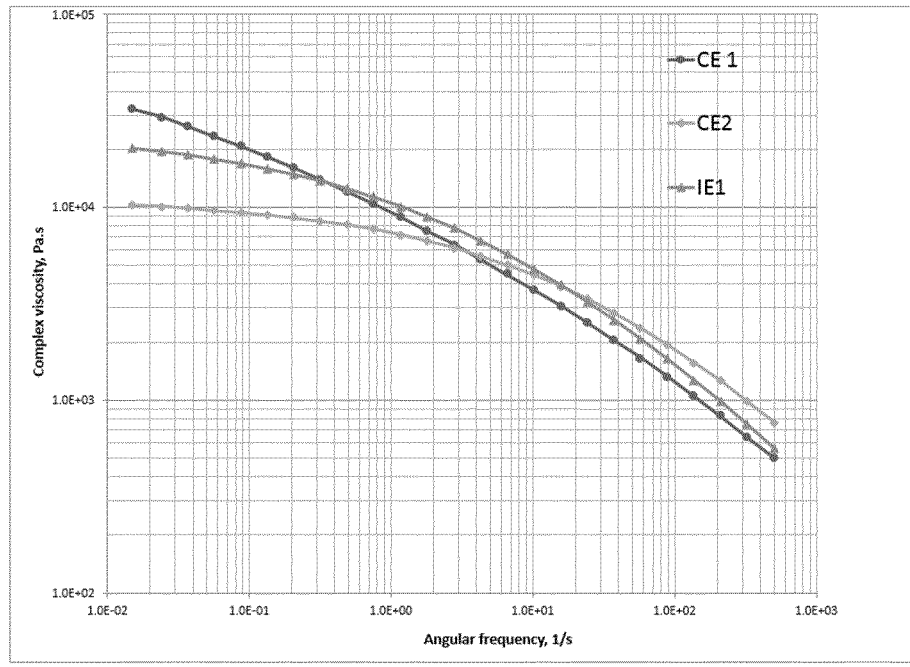
FIG. 1 shows the rheological frequency sweep curves shown as complex viscosities over the angular frequencies in a double-logarithmical graph of the examples IE1, CE1 and CE2.

The base resin according to the present invention comprises, preferably consists of, at least two ethylene homo- or copolymer components which differ in their weight average molecular weight Mw and/or their comonomer content.

The low molecular weight ethylene polymer component thereby has a lower weight average molecular weight than the high molecular weight ethylene polymer component.

The base resin may comprise other polymers differing from the low molecular weight ethylene polymer component and the high molecular weight ethylene polymer component. It is, however, preferred that the base resin consists of the low molecular weight ethylene polymer component and the high molecular weight ethylene polymer component.

In some embodiments the low molecular weight ethylene polymer component may be copolymer component of ethylene and at least one, preferably one comonomer selected from alpha-olefins having from 4 to 8 carbon atoms, such as 1-butene, 1-hexene, 4-methyl-1-pentene and 1-octene. Especially preferred in these embodiments are 1-butene and 1-hexene.

It is, however, preferred that the low molecular ethylene polymer weight component is an ethylene homopolymer component.

The low molecular ethylene polymer weight component preferably has a density of from 968 to 975 kg/m$^3$, more preferably of from 969 to 973 kg/m$^3$.

The low molecular ethylene polymer weight component preferably has a weight average molecular weight Mw of from 20 to 40 kg/mol, more preferably of from 22 to 35 kg/mol.

Further, the low molecular ethylene polymer weight component preferably has a number average molecular weight Mn of from 4000 to 8000 g/mol, more preferably of from 4500 to 7500 g/mol.

Still further, the low molecular ethylene polymer weight component preferably has a z average molecular weight Mz of from 75 to 240 kg/mol, more preferably of from 85 to 220 kg/mol.

Preferably, the low molecular ethylene polymer weight component has a ratio Mw/Mn of from 3 to 8, more preferably of from 4 to 7.

It is preferred that the low molecular ethylene polymer weight component has a ratio Mz/Mw of from 4 to 12, more preferably of from 5 to 10.

The low molecular ethylene polymer weight component preferably has a melt flow rate MFR$_2$ (190° C., 2.16) of from 180 to 360 g/10 min, more preferably of from 240 to 320 g/10 min.

The low molecular ethylene polymer weight component is preferably present in the base resin in an amount of from 40 wt % to 48 wt %, more preferably of from 42 to 46 wt %, based on the total weight amount of the base resin.

Preferably the high molecular weight ethylene polymer component is copolymer component of ethylene and at least one alpha olefin comonomer.

Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene.

The ethylene copolymer may further comprise further comonomer units different from alpha olefin comonomers such as dienes, polar comonomers or silicon containing comonomers. It is, however, preferred that the ethylene copolymer only contains alpha olefin monomers as comonomer units.

It is especially preferred that the ethylene copolymer contains 1-butene and/or 1-hexene as comonomer units.

In one especially preferred embodiment, the ethylene copolymer comprises one alpha-olefin comonomer. In this embodiment the alpha-olefin comonomer preferably is 1-hexene or 1-butene. Thus, the ethylene copolymer preferably is either an ethylene/1-hexene copolymer or an ethylene/1-butene copolymer.

The high molecular ethylene polymer weight component preferably has a density of from 940 to 955 kg/m$^3$, more preferably of from 942 to 952 kg/m$^3$.

The low molecular ethylene polymer weight component preferably has a calculated melt flow rate MFR$_2$ (190° C., 2.16) of from 0.001 to 0.020 g/10 min, more preferably of from 0.003 to 0.012 g/10 min.

The high molecular ethylene polymer weight component is preferably present in the base resin in an amount of from 52 wt % to 60 wt %, more preferably of from 54 to 58 wt %, based on the total weight amount of the base resin.

Preferably, the weight ratio of the low molecular weight ethylene copolymer and the high molecular weight ethylene copolymer in the base resin is from 40:60 to 48:52, more preferably from 44:56 to 46:54.

Density (Base Resin)

The base resin according to the present invention has a density of at least 958.0 kg/m$^3$.

Preferably the density of the base resin is equal to or more than 958.0 kg/m$^3$ and equal to or less than 965.0 kg/m$^3$, more preferably equal to or more than 958.5 kg/m$^3$ and equal to or less than 964.0 kg/m$^3$, still more preferably equal to or more than 959.0 kg/m$^3$ and equal to or less than 963.0 kg/m$^3$ and most preferably equal to or more than 959.5 kg/m$^3$ and equal to or less than 962.0 kg/m$^3$.

Polyethylene Composition

In addition to the base resin, the polyethylene composition may comprise and preferably comprises usual additives for utilization with polyolefins, such as stabilizers (e.g. antioxidant agents), acid scavengers and/or UV-stabilizers.

Preferably, the amount of these additives is 1.0 wt % or below, more preferably 0.5 wt % or below, more preferably 0.25 wt % or below, of the polyethylene composition.

The polyethylene composition is characterized by the following properties:

MFR$_2$

The polyethylene composition has a melt flow rate MFR$_2$ (190° C., 2.16 kg) of from 0.50 g/10 min to 0.80 g/10 min, more preferably of from 0.55 g/10 min to 0.76 g/10 min, and most preferably of from 0.60 g/10 min to 0.74 g/10 min, determined according to ISO 1133.

MFR$_5$

The polyethylene composition preferably has a melt flow rate MFR$_5$ (190° C., 5 kg) of from 2.0 g/10 min to 3.5 g/10 min, more preferably of from 2.2 g/10 min to 3.2 g/10 min, and most preferably of from 2.3 g/10 min to 2.9 g/10 min, determined according to ISO 1133.

MFR$_{21}$

The polyethylene composition preferably has a melt flow rate MFR$_{21}$ (190° C., 21.6 kg) of from 30 to 50 g/10 min, preferably of 32 to 48 g/10 min, and most preferably of 35 to 45 g/10 min, determined according to ISO 1133.

FRR$_{21/5}$

The polyethylene composition preferably has a flow rate ratio FRR$_{21/5}$, being the ratio of MFR$_{21}$ to MFR$_5$, of from 10 to 25, more preferably of from 12 to 23 and most preferably of from 15 to 20.

FRR$_{21/2}$

The polyethylene composition preferably has a flow rate ratio FRR$_{21/2}$, being the ratio of MFR$_{21}$ to MFR$_2$, of from 50 to 75, more preferably of from 53 to 73 and most preferably of from 55 to 70.

Weight Average Molecular Weight Mw

The polyethylene composition preferably has a weight average molecular weight, Mw, in the range of 90 to 130 kg/mol, more preferably 95 to 125 kg/mol, most preferably in the range of 100 to 120 kg/mol.

Number Average Molecular Weight Mn

The polyethylene composition preferably has a number average molecular weight, Mn, in the range of 7.0 to 10.0 kg/mol, more preferably 7.5 to 9.5 kg/mol, most preferably in the range of 8.0 to 9.0 kg/mol.

z Average Molecular Weight Mz

The polyethylene composition preferably has a z average molecular weight, Mz, in the range of 400 to 800 kg/mol, more preferably 425 to 700 kg/mol, most preferably in the range of 450 to 600 kg/mol.

Molecular Weight Distribution Mw/Mn

The polyethylene composition has a molecular weight distribution, Mw/Mn, in the range of 10.0 to 15.0, more preferably in the range of 11.0 to 14.5 and most preferably in the range of 12.0 to 14.0.

Density

The composition preferably has a density of from 958.0 kg/m$^3$ to 965.0 kg/m$^3$, more preferably of from 958.5 kg/m$^3$ to 964.0 kg/m$^3$, most preferably of from 959.0 kg/m$^3$ to 962.0 kg/m$^3$, determined according to ISO 1183-1:2004.

The density of the base resin is mainly influenced by the amount and type of comonomer. In addition to that, the nature of the polymer originating mainly from the catalyst used as well as the melt flow rate play a role. In addition to that, it should be stressed that the comonomer does not need to be a single comonomer. Mixtures of comonomers are also possible.

The composition is further characterized by specific rheological properties.

eta$_{0.05}$

The polyethylene composition preferably has a complex viscosity at 0.05 rad/s eta$_{0.05}$ of from 10000 Pa·s to 25000 Pa·s, preferably of from 12500 Pa·s to 23000 Pa·s, more preferably of from 14000 Pa·s to 21000 Pa·s, and most preferably of from 16000 Pa·s to 20000 Pa·s.

The viscosity eta$_{0.05}$ is measured at a low frequency and thus a low shear stress and is proportional to the molecular weight of the composition. It can thus be seen as a measure for the molecular weight of the polyethylene composition.

eta$_{300}$

The polyethylene composition preferably has a complex viscosity at 300 rad/s eta$_{300}$ of 500 Pa·s to 1000 Pa·s, more preferably 600 Pa·s to 900 Pa·s, and most preferably 700 Pa·s to 800 Pa·s.

The viscosity eta$_{300}$ is measured at a high frequency and thus a high shear stress and is inversely proportional to the flowability of the composition. It can thus be seen as a measure for the processability of the polyethylene composition.

Viscosity at a Constant Shear Stress of 747 Pa eta$_{747}$

The polyethylene composition preferably has a viscosity at a constant shear stress of 747 Pa eta$_{747}$ of 10000 Pa·s to 30000 Pa·s, more preferably 12500 Pa·s to 27500 Pa·s and most preferably 15000 Pa·s to 25000 Pa·s.

The viscosity at a constant shear stress of 747 Pa eta$_{747}$ is influenced by the weight average molecular weight.

Shear Thinning Index SHI$_{2.7/210}$

The polyethylene composition preferably has a shear thinning index SHI$_{2.7/210}$ being the ratio of the complex shear modulus of 2.7 kPa to the complex shear modulus of 210 kPa, of from 10 to 20, more preferably of from 11 to 19 and mot preferably of from 12 to 18.

Shear Thinning Index SHI$_{5/200}$

The polyethylene composition preferably has a shear thinning index SHI$_{5/200}$ being the ratio of the complex shear modulus of 5 kPa to the complex shear modulus of 200 kPa, of from 8 to 18, more preferably of from 9 to 17 and mot preferably of from 10 to 16.

The shear thinning indices are ratios of complex shear moduli at the upper and lower and of the rheological frequency curves and thus can be seen as rheological measures for the polydispersity.

The rheological properties, such as SHI$_{2.7/210}$, SHI$_{5/200}$, eta$_{0.05}$, eta$_{300}$ and eta$_{747}$ described above, have been determined on the polyethylene composition which differs from the base resin by comprising additional components such as additives. These properties, however, can also be determined on the base resin, which has been stabilized with a stabilizer package. The rheological properties determined on the base resin are preferably in the same ranges as when determined on the polyethylene composition.

Tensile Modulus

The polyethylene composition preferably has a tensile modulus, determined according to ISO 527-1 of equal to or more than 1200 MPa, more preferably of equal to or more than 1250 MPa, and most preferably of equal to or more than 1300 MPa.

The upper limit of the tensile modulus is usually not higher than 1600 MPa, preferably not higher than 1500 MPa.

Tensile Strain at Yield

The polyethylene composition preferably has a tensile strain at yield determined according to ISO 527-1 of at least 7.0%, more preferably of at least 7.5%, and most preferably of at least 8.0%. The upper limit of the tensile strain at yield is usually equal to or less than 10%, more preferably equal to or less than 9.5%.

Tensile Stress at Yield

The polyethylene composition preferably has a tensile stress at yield determined according to ISO 527-1 of at least 26 MPa, more preferably of at least 27 MPa, even more preferably of at least 28 MPa, and most preferably of at least 29 MPa. The upper limit of the tensile stress at break is usually equal to or less than 32 MPa, more preferably equal to or less than 31 MPa.

Flexural Modulus

The polyethylene composition preferably has a flexural modulus, determined according to ISO 178 of equal to or more than 1200 MPa, more preferably of equal to or more than 1300 MPa, and most preferably of equal to or more than 1400 MPa. The upper limit of the tensile modulus is usually not higher than 1800 MPa, preferably not higher than 1600 MPa.

Environmental Stress Crack Resistance ESCR

The polyethylene composition preferably has an environmental stress crack resistance ESCR (F50) of at least 72 h, more preferably of at least 80 h, still more preferably of at least 90 h and most preferably of at least 100 h, determined according to ASTM D 1693-B in 10% Igepal. The upper limit of the environmental stress crack resistance ESCR is usually not higher than 150 h, preferably not higher than 140 h.

Article

In yet a further aspect, the present invention is concerned with an article comprising the polyethylene composition as described above or below, obtainable by a process as described above or below and the use of such a polyethylene composition for the production of an article.

The article preferably is a film, or a blow molded article.

It is especially preferred that the article is a film, such as a blown film or a cast film or a multi-layered film. In a multi-layered film the polyethylene composition is preferably comprised in one or more layers of the multi-layered film.

Films comprising the polyethylene composition according to the invention are preferably characterized by the following properties:

Tensile Modulus in Machine Direction (TM-MD)

A film comprising the polyethylene composition according to the invention preferably has a tensile modulus in machine direction (TM-MD) of at least 1000 MPa, more preferably at least 1050 MPa, when measured on a 25 μm blown film. The upper limit of the tensile modulus in machine direction is usually not higher than 1500 MPa, preferably not higher than 1400 MPa.

Tensile Modulus in Transverse Direction (TM-TD)

A film comprising the polyethylene composition according to the invention preferably has a tensile modulus in transverse direction (TM-TD) of at least 1000 MPa, more preferably at least 1250 MPa, and most preferably at least 1500 MPa, when measured on a 25 μm blown film. The upper limit of the tensile modulus in transverse direction is usually not higher than 2000 MPa, preferably not higher than 1800 MPa.

Tensile Strength at Break in Machine Direction (TSB-MD)

A film comprising the polyethylene composition according to the invention preferably has a tensile strength at break in machine direction (TSB-MD) of at least 50 MPa, more preferably at least 60 MPa, and most preferably at least 70 MPa, when measured on a 25 μm blown film. The upper limit of the tensile strength at break in machine direction is usually not higher than 100 MPa, preferably not higher than 90 MPa.

Tensile Strength at Break in Transverse Direction (TSB-TD)

A film comprising the polyethylene composition according to the invention preferably has a tensile strength at break in transverse direction (TSB-TD) of at least 25 MPa, more preferably at least 27 MPa, and most preferably at least 30 MPa, when measured on a 25 μm blown film. The upper limit of the tensile strength at break in transverse direction is usually not higher than 60 MPa, preferably not higher than 50 MPa.

Tensile Strength at Yield in Machine Direction (TSY-MD)

A film comprising the polyethylene composition according to the invention preferably has a tensile strength at yield in machine direction (TSY-MD) of at least 25 MPa, more preferably at least 28 MPa, and most preferably at least 30 MPa, when measured on a 25 μm blown film. The upper limit of the tensile strength at yield in machine direction is usually not higher than 50 MPa, preferably not higher than 45 MPa.

Tensile Strength at Yield in Transverse Direction (TSY-TD)

A film comprising the polyethylene composition according to the invention preferably has a tensile strength at yield in transverse direction (TSY-TD) of at least 27 MPa, more preferably at least 28 MPa, and most preferably at least 30 MPa, when measured on a 25 μm blown film. The upper limit of the tensile strength at yield in transverse direction is usually not higher than 60 MPa, preferably not higher than 55 MPa.

Elongation at Break in Machine Direction (EB-MD)

A film comprising the polyethylene composition according to the invention preferably has an elongation at break in machine direction (EB-MD) of at least 400%, more preferably at least 450%, and most preferably at least 475%, when measured on a 25 μm blown film. The upper limit of the elongation at break in machine direction is usually not higher than 750%, preferably not higher than 700%.

Elongation at Yield in Machine Direction (EY-MD)

A film comprising the polyethylene composition according to the invention preferably has an elongation at yield in machine direction (EY-MD) of at least 3.5%, more preferably at least 4.0%, and most preferably at least 4.5%, when measured on a 25 μm blown film. The upper limit of the elongation at yield in machine direction is usually not higher than 7.5%, preferably not higher than 7.0%.

Elongation at Yield in Transverse Direction (EY-TD)

A film comprising the polyethylene composition according to the invention preferably has an elongation at yield in transverse direction (EY-TD) of at least 1.5%, more preferably at least 2.0%, and most preferably at least 2.5%, when measured on a 25 μm blown film. The upper limit of the elongation at yield in transverse direction is usually not higher than 7.0%, preferably not higher than 6.5%.

Elmendorf Tear Strength in Machine Direction (TS-MD)

A film comprising the polyethylene composition according to the invention preferably has an Elmendorf tear strength in machine direction (TS-MD) of at least 0.05 N, more preferably at least 0.09 N, and most preferably at least 0.11 N, when measured on a 25 µm blown film. The upper limit of Elmendorf tear strength in machine direction is usually not higher than 0.50 N, preferably not higher than 0.45 N.

Elmendorf Tear Strength in Transverse Direction (TS-TD)

A film comprising the polyethylene composition according to the invention preferably has an Elmendorf tear strength in transverse direction (TS-TD) of at least 6.5 N, more preferably at least 7.5 N, and most preferably at least 8.0 N, when measured on a 25 µm blown film. The upper limit of Elmendorf tear strength in transverse direction is usually not higher than 20.0 N, preferably not higher than 15.0 N.

Puncture Resistance—Force (PRF)

A film comprising the polyethylene composition according to the invention preferably has a puncture resistance—force (PRF) of at least 25 N, more preferably at least 28 N, and most preferably at least 30 N, when measured on a 25 µm blown film. The upper limit of the puncture resistance—force (PRF) is usually not higher than 60 N, preferably not higher than 55 N.

Puncture Resistance—Energy (PRE)

A film comprising the polyethylene composition according to the invention preferably has a puncture resistance—energy (PRE) of at least 0.50 J, more preferably at least 0.55 J, and most preferably at least 0.60 J, when measured on a 25 µm blown film. The upper limit of the puncture resistance—energy (PRE) is usually not higher than 2.0 J, preferably not higher than 1.5 J.

Water Vapor Transmission Rate at 100% Relative Humidity

A film comprising the polyethylene composition according to the invention preferably has a water vapor transmission rate at 100% relative humidity at 23° C. (WVTR-100% RH) of not more than 10.0 g/m²/day, more preferably not more than 9.5 g/m²/day, and most preferably not more than 9.0 g/m²/day, when measured on a 25 µm blown film. The lower limit of the water vapor transmission rate at 100% relative humidity at 23° C. (WVTR-100% RH) is usually not lower than 4.0 g/m²/day, preferably not lower than 5.0 g/m²/day.

Water Vapor Transmission Rate at 90% Relative Humidity

A film comprising the polyethylene composition according to the invention preferably has a water vapor transmission rate at 90% relative humidity at 23° C. (WVTR-90% RH) of not more than 9.0 g/m²/day, more preferably not more than 8.5 g/m²/day, and most preferably not more than 8.0 g/m²/day, when measured on a 25 µm blown film. The lower limit of the water vapor transmission rate at 90% relative humidity at 23° C. (WVTR-90% RH) is usually not lower than 3.0 g/m²/day, preferably not lower than 4.0 g/m²/day.

Oxygen Transmission Rate

A film comprising the polyethylene composition according to the invention preferably has an oxygen transmission rate (OTR) of not more than 3100 cm³/m²/day, more preferably not more than 3000 cm³/m²/day, and most preferably not more than 2900 cm³/m²/day, when measured on a 25 µm blown film. The lower limit of the oxygen transmission rate (OTR) is usually not lower than 1500 cm³/m²/day, preferably not lower than 1600 cm³/m²/day.

Gel Content

A film comprising the polyethylene composition according to the invention preferably has not more than 0.5 gels/m², more preferably 0.1 gels/m² and most preferably no gels/m² of more than 1000 µm diameter, when measured on a 70 µm cast film.

A film comprising the polyethylene composition according to the invention preferably has not more than 2.0 gels/m², more preferably not more than 1.5 gels/m² and most preferably not more than 1.0 gels/m² of 601-1000 µm diameter, when measured on a 70 µm cast film. The lower limit for the content of gels of 601-1000 µm diameter is usually not lower than 0.01 gels/m², more preferably not lower than 0.1 gels/m².

A film comprising the polyethylene composition according to the invention preferably has not more than 35 gels/m², more preferably not more than 20 gels/m² and most preferably not more than 17 gels/m² of 301-600 µm diameter, when measured on a 70 µm cast film. The lower limit for the content of gels of 301-600 µm diameter is usually not lower than 5 gels/m², more preferably not lower than 7 gels/m².

A film comprising the polyethylene composition according to the invention preferably has not more than 140 gels/m², more preferably not more than 120 gels/m² and most preferably not more than 80 gels/m² of 100-300 µm diameter, when measured on a 70 µm cast film. The lower limit for the content of gels of 100-300 µm diameter is usually not lower than 10 gels/m², more preferably not lower than 20 gels/m².

Process

The polyethylene composition is produced in a process, wherein the base resin is polymerized in a multistage process in at least two sequential reactor stages in any order in the presence of a polymerization catalyst.

Polymerization Catalyst

The preferred polymerisation catalyst is a Ziegler-Natta polymerization catalyst, which preferably contains a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has an average particle size from 15 to 30 µm, preferably from 18 to 25 µm. Especially it has been found out that the average particle size of the polymer produced in the process of the invention is the same irrespective whether the catalyst is prepared on a 20 µm support or on a 40 µm support. In fact, the fraction of fine polymer particles has been found to be lower if a support having an average particle size of 20 µm is used. The reduction of the fine polymer reduces the risk of plugging and thus contributes to a stable process operation. This, on the other hand, helps to produce polymer films with a good homogeneity. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794. Alternatively, it can be prepared by first preparing a solution from the components and then contacting the solution with a carrier, as described in WO-A-01/55230.

Further suitable catalysts are described in EP 2 799 456.

The above mentioned solid catalyst component is contacted with an aluminium alkyl cocatalyst, which preferably is an aluminium trialkyl compound, after which it can be used in polymerisation. The contacting of the solid catalyst component and the aluminium alkyl cocatalyst can either be conducted prior to introducing the catalyst into the polymerisation reactor, or it can be conducted by introducing the two components separately into the polymerisation reactor.

Process Details:

The process for producing the polyethylene composition according to the present invention comprises the following steps:

a) polymerizing ethylene in the presence of a polymerization catalyst in a first polymerization reactor for producing a first intermediate material comprising the low molecular weight ethylene polymer component;
b) transferring the first intermediate material into a second polymerization reactor;
c) polymerizing ethylene and at least one comonomer selected from alpha-olefins having from 4 to 8 carbon atoms in the presence of the first intermediate material for producing a base resin comprising the low molecular weight ethylene polymer component and the high molecular weight ethylene polymer component;
d) compounding the base resin to obtain the polyethylene composition.

The first intermediate material preferably comprises the low molecular weight ethylene polymer component as defined above or below.

The base resin preferably comprises the low molecular weight ethylene polymer component and the high molecular weight ethylene polymer component as defined above or below.

The base resin and the polyethylene composition are preferably defined by the properties of the base resin and the polyethylene composition described above or in the claims.

The temperature in the first reactor, preferably the first slurry phase reactor, more preferably the first loop reactor, is typically from 50 to 115° C., preferably from 60 to 110° C. and in particular from 70 to 100° C. The pressure is typically from 1 to 150 bar, preferably from 1 to 100 bar.

The slurry phase polymerization may be conducted in any known reactor used for slurry phase polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479 186 and U.S. Pat. No. 5,391,654.

It is sometimes advantageous to conduct the slurry phase polymerization above the critical temperature and pressure of the fluid mixture. Such operations are described in U.S. Pat. No. 5,391,654. In such an operation the temperature is typically at least 85° C., preferably at least 90° C. Furthermore the temperature is typically not higher than 110° C., preferably not higher than 105° C. The pressure under these conditions is typically at least 40 bar, preferably at least 50 bar. Furthermore, the pressure is typically not higher than 150 bar, preferably not higher than 100 bar. In a preferred embodiment the slurry phase polymerization step, is carried out under supercritical conditions whereby the reaction temperature and reaction pressure are above equivalent critical points of the mixture formed by hydrocarbon medium, monomer, hydrogen and optional comonomer and the polymerization temperature is lower than the melting temperature of the polymer formed.

The slurry may be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. Nos. 3,374,211, 3,242,150 and EP-A-1 310 295. Continuous withdrawal is disclosed, amongst others, in EP-A-891 990, EP-A-1 415 999, EP-A-1 591 460 and WO-A-2007/025640. The continuous withdrawal is advantageously combined with a suitable concentration method as disclosed in EP-A-1 415 999 and EP-A-1 591 460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into the slurry phase reactor.

However, the settling legs withdraw the polymer intermittently. This causes the pressure and also other variables in the reactor to fluctuate with the period of the withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as a hydrocyclone or sieve, as disclosed in EP-A-1 415 999 and EP-A-1 591 460. The polymer-rich stream is then directed to a flash and the polymer-lean steam is returned directly into the reactor.

For adjusting the melt flow rate of the polyethylene fraction polymerized in the slurry phase reactor preferably hydrogen is introduced into the reactor.

The hydrogen feed in the first reaction stage is preferably adjusted to the ethylene feed in order to fulfil a hydrogen to ethylene ratio in the first slurry phase reactor of 300 to 750 mol/kmol, more preferably of 350 to 700 mol/kmol.

The polyethylene fraction produced in the first slurry phase reactor can be an ethylene homopolymer fraction or an ethylene copolymer fraction.

It is preferred that no comonomer is introduced into the first slurry phase reactor. The residence time and the polymerization temperature in the first slurry phase reactor are adjusted as such as to polymerize an ethylene homopolymer fraction typically in an amount of 40 to 48 wt %, preferably 42 to 46 wt % of the total base resin.

Before directing the polymer slurry to the second polymerization reactor it can be subjected to a purging step for substantially removing hydrocarbons from the polymer slurry. The purging step is preferably conducted in a flash vessel operated at a pressure of 2 to 10 bar and a temperature of 50 to 100° C. After applying the purging step, the first intermediate material produced in the first slurry reactor preferably is transferred to a second reactor, preferably a gas phase reactor, more preferably a fluidized bed gas phase reactor.

In a fluidised bed gas phase reactor an olefin is polymerized in the presence of a polymerization catalyst in an upwards moving gas stream. The reactor typically contains a fluidised bed comprising the growing polymer particles containing the active catalyst located above a fluidisation grid.

The polymer bed is fluidised with the help of a fluidisation gas comprising the olefin monomer, eventually comonomer(s), eventually chain growth controllers or chain transfer agents, such as hydrogen, and eventually inert gas. The inert gas can thereby be the same or different as the inert gas used in the slurry phase reactor. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e. g. U.S. Pat. No. 4,933,149 and EP-A-684 871.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087261. Other types of fluidisation grids are disclosed, amongst others, in U.S. Pat. No. 4,578,879, EP 600 414 and EP-A-721 798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be higher than the minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practice. An overview is given, amongst others, in Geldart: Gas Fluidisation Technology, J. Wiley & Sons, 1996.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is then removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerization.

After that the gas is cooled in a heat exchanger to remove the reaction heat. The gas is cooled to a temperature which is lower than that of the bed to prevent the bed from being heated because of the reaction. It is possible to cool the gas to a temperature where a part of it condenses. When the liquid droplets enter the reaction zone they are vaporized. The vaporisation heat then contributes to the removal of the reaction heat. This kind of operation is called condensed mode and variations of it are disclosed, amongst others, in WO-A-2007/025640, U.S. Pat. No. 4,543,399, EP-A-699 213, and WO-A-94/25495. It is also possible to add condensing agents into the recycle gas stream, as disclosed in EP-A-696 293. The condensing agents are non-polymerizable components, such as propane, n-pentane, isopentane, n-butane or isobutane, which are at least partially condensed in the cooler.

The polymeric product may be withdrawn from the gas phase reactor either continuously or intermittently. Combinations of these methods may also be used. Continuous withdrawal is disclosed, amongst others, in WO-A-00/29452. Intermittent withdrawal is disclosed, amongst others, in U.S. Pat. No. 4,621,952, EP-A-188 125, EP-A-250 169 and EP-A-579 426.

The top part of the at least one gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed levels.

Also antistatic agent(s) may be introduced into the at least one gas phase reactor if needed. Suitable antistatic agents and methods to use them are disclosed, amongst others, in U.S. Pat. Nos. 5,026,795, 4,803,251, 4,532,311, 4,855,370 and EP-A-560 035. They are usually polar compounds and include, amongst others, water, ketones, aldehydes alcohols.

The reactor may include a mechanical agitator to further facilitate mixing within the fluidised bed. An example of suitable agitator design is given in EP-A-707 513.

The temperature in the gas phase polymerization in the gas phase reactor typically is at least 70° C., preferably at least 80° C. The temperature typically is not more than 105° C., preferably not more than 95° C. The pressure is typically at least 10 bar, preferably at least 15 bar but typically not more than 30 bar, preferably not more than 25 bar.

For adjusting the melt flow rate of the polyethylene fraction polymerized in the first gas phase reactor hydrogen is introduced into the reactor.

The hydrogen feed is preferably adjusted to the ethylene feed in order to fulfil a hydrogen to ethylene ratio in the gas phase reactor of 50 to 200 mol/kmol, more preferably of 70 to 170 mol/kmol and most preferably 90 to 150 mol/kmol.

In the gas phase reactor preferably an ethylene copolymer fraction is produced. The fluidisation gas stream thus comprises comonomers preferably selected from the group consisting of alpha-olefin comonomers with 4 to 8 carbon atoms. Suitable alpha-olefin comonomer species are 1-butene, 1-hexene and 1-octene. 1-butene or 1-hexene are mostly preferred. The comonomer used in the first gas phase reactor may be the same or different to that used in the slurry phase reactor. The comonomer feed is preferably adjusted to the ethylene feed in order to fulfil a comonomer to ethylene ratio of at least 1.0 to 50 mol/kmol, more preferably 2.5 to 30 mol/kmol, most preferably 5.0 to 25 mol/kmol.

The residence time and the polymerization temperature in the gas phase reactor are adjusted as such as to polymerize an ethylene copolymer fraction typically in an amount of 52 to 60 wt % and most preferably 54 to 58 wt % of the total base resin. Further, the final base resin emerging from the gas phase reactor, preferably consisting of the low molecular weight ethylene polymer component and the high molecular weight ethylene polymer component preferably has a density of at least 958.0 kg/m³. Preferably the density of the base resin is equal to or more than 958.0 kg/m³ and equal to or less than 965.0 kg/m³, more preferably equal to or more than 958.5 kg/m³ and equal to or less than 964.0 kg/m³, still more preferably equal to or more than 959.0 kg/m³ and equal to or less than 963.0 kg/m³ and most preferably equal to or more than 959.5 kg/m³ and equal to or less than 962.0 kg/m³.

The polymerization of low molecular weight ethylene polymer component and high molecular weight ethylene polymer component in the first and second polymerization zones may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 40 to 70° C.

The pressure is not critical and is typically from 1 to 150 bar, preferably from 10 to 100 bar.

The polymerization catalyst can be fed to any polymerization stage but preferably is fed to the first polymerization stage or the prepolymerization stage, when present.

The catalyst components are preferably all introduced to the prepolymerization step.

Preferably the reaction product of the prepolymerization step is then introduced to the first polymerization reactor. The prepolymer component is calculated to the amount of the component that is produced in the first actual polymerisation step after the prepolymerisation step, preferably to the amount of the low molecular weight ethylene polymer component.

Compounding

The polyethylene composition of the invention preferably is produced in a multistage process which further comprises a compounding step, wherein the base resin, which is typically obtained as a base resin powder from the reactor, is extruded in an extruder and then pelletized to polymer pellets in a manner known in the art to form the polyolefin composition of the invention.

Optionally, additives or other polymer components can be added to the composition during the compounding step in an amount as described above. Preferably, the composition of the invention obtained from the reactor is compounded in the extruder together with additives in a manner known in the art.

The extruder may be e.g. any conventionally used extruder. As an example of an extruder for the present compounding step may be those supplied by Japan Steel works, Kobe Steel or Farrel-Pomini, e.g. JSW 460P or JSW CIM90P.

Film Production

Polymeric films are usually produced by blown film extrusion or by cast film extrusion.

In the case of multi-layered films several layers of a film can be coextruded or laminated during blown film extrusion or cast film extrusion.

These processes are well known in the art and are easily adaptable for producing films comprising the polyethylene composition according to the present invention.

Use

The present invention further relates to the use of the polyethylene composition as defined above or below for the production of an article such as a film as described above or below.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature of 190° C. and a load of 5 kg, the $MFR_2$ of polyethylene at a temperature of 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$ and Thus, $FRR_{21/2}$ denotes the value of $MFR_{21}/MFR_2$.

The $MFR_2$ of the high molecular weight ethylene polymer component polymerized in the second polymerization reactor is calculated from the $MFR_2$ of the low molecular weight ethylene polymer component polymerized in the first polymerization reactor and the $MFR_2$ of the base resin as follows:

$$\text{Log MFR}_{final} = \text{wt \%1st} \times \text{Log MFR}_{1st} + \text{wt \%2nd} \times \text{Log MFR}_{2nd}$$

wherein
"final" means "of the polyethylene resin"
"1st" means "of the polymer component produced in the first reactor
"2nd" means "of the polymer component produced in the second reactor.

b) Density

Density of the polymer was measured according to ISO 1183-1:2004 Method A on compression moulded specimen prepared according to EN ISO 1872-2 (February 2007) and is given in kg/m³.

c) Comonomer Content $^{13}C$-NMR spectra were recorded on Bruker 400 MHz spectrometer at 130° C. from samples dissolved in 1, 2, 4-trichlorobenzene/benzene-d6 (90/10 w/w). Conversion between % wt and % mol can be carried out by calculation.

d) Rheological Parameters

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, $G'$, the shear loss modulus, $G''$, the complex shear modulus, $G^*$, the complex shear viscosity, $\eta^*$, the dynamic shear viscosity, $\eta'$, the out-of-phase component of the complex shear viscosity, $\eta''$ and the loss tangent, tan $\eta$, which can be expressed as follows:

$$G' = \frac{\sigma_0}{\gamma_0}\cos\delta \, [Pa] \quad (3)$$

$$G'' = \frac{\sigma_0}{\gamma_0}\sin\delta \, [Pa] \quad (4)$$

$$G^* = G' + iG'' \, [Pa] \quad (5)$$

$$\eta^* = \eta' = i\eta'' \, [Pa \cdot s] \quad (6)$$

$$\eta' = \frac{G''}{\omega} \, [Pa \cdot s] \quad (7)$$

$$\eta'' = \frac{G'}{\omega} \, [Pa \cdot s] \quad (8)$$

The determination of so-called Shear Thinning Index, which correlates with MWD and is independent of Mw, is done as described in equation 9.

$$SHI_{(x/y)} = \frac{Eta^* \text{ for } (G^* = x \text{ kPa})}{Eta^* \text{ for } (G^* = y \text{ kPa})} \quad (9)$$

For example, the $SHI_{(2.7/210)}$ is defined by the value of the complex viscosity, in Pa s, determined for a value of $G^*$ equal to 2.7 kPa, divided by the value of the complex viscosity, in Pa s, determined for a value of $G^*$ equal to 210 kPa and the $SHI_{(5/200)}$ is defined by the value of the complex viscosity, in Pa s, determined for a value of $G^*$ equal to 5 kPa, divided by the value of the complex viscosity, in Pa s, determined for a value of $G^*$ equal to 200 kPa.

The values of storage modulus ($G'$), loss modulus ($G''$), complex modulus ($G^*$) and complex viscosity ($\eta^*$) were obtained as a function of frequency ($\omega$).

Thereby, e.g. $\eta^*_{300 \, rad/s}$ (eta*$_{300 \, rad/s}$) is used as abbreviation for the complex viscosity at the frequency of 300 rad/s and $\eta^*_{0.05 \, rad/s}$ (eta*$_{0.05 \, rad/s}$) is used as abbreviation for the complex viscosity at the frequency of 0.05 rad/s.

The loss tangent tan (delta) is defined as the ratio of the loss modulus ($G''$) and the storage modulus ($G'$) at a given frequency. Thereby, e.g. $\tan_{0.05}$ is used as abbreviation for the ratio of the loss modulus ($G''$) and the storage modulus ($G'$) at 0.05 rad/s and $\tan_{300}$ is used as abbreviation for the ratio of the loss modulus ($G''$) and the storage modulus ($G'$) at 300 rad/s.

The elasticity balance $\tan_{0.05}/\tan_{300}$ is defined as the ratio of the loss tangent $\tan_{0.05}$ and the loss tangent $\tan_{300}$.

Besides the above mentioned rheological functions one can also determine other rheological parameters such as the so-called elasticity index EI(x). The elasticity index Ei(x) is the value of the storage modulus, $G'$ determined for a value of the loss modulus, $G''$ of x kPa and can be described by equation 10.

$$EI(x)=G' \text{ for}(G''=x \text{ kPa})[Pa] \quad (10)$$

For example, the EI(5 kPa) is the defined by the value of the storage modulus $G'$, determined for a value of $G''$ equal to 5 kPa.

The polydispersity index, PI, is defined by equation 11.

$$PI = \frac{10^5}{G'(\omega_{COP})}, \omega_{COP} = \omega \text{ for } (G' = G'') \quad (11)$$

where $\omega_{COP}$ is the cross-over angular frequency, determined as the angular frequency for which the storage modulus, $G'$, equals the loss modulus, $G''$.

The values are determined by means of a single point interpolation procedure, as defined by Rheoplus software. In situations for which a given $G^*$ value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362.

[2] "The influence of molecular structure on some rheological properties of polyethylene", Heino, E. L., Borealis Polymers Oy, Porvoo, Finland, Annual Transactions of the Nordic Rheology Society, 1995.

[3] "Definition of terms relating to the non-ultimate mechanical properties of polymers", Pure & Appl. Chem., Vol. 70, No. 3, pp. 701-754, 1998.

e) Viscosity eta$_{747}$

One method which is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. A 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

J) Molecular Weight

Molecular weight averages ($M_z$, $M_w$ and $M_n$), Molecular weight distribution (MWD) and its broadness, described by polydispersity index, PDI=$M_w$/$M_n$ (wherein $M_n$ is the number average molecular weight and $M_w$ is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or Polymer-Char GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ A third order polynomial fit was used to fit the calibration data.

All samples were prepared in the concentration range of around 0.1 mg/ml and dissolved at 160° C. for 6 hours for PE in fresh distilled TCB stabilized with 1000 ppm Irgafos168 under continuous gentle shaking.

g) DSC Analysis

Melting temperature Tm and Crystallisation temperature Tc were measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature and heat of crystallization (Hc) are determined from the cooling step, while melting temperature (Tm) and heat of fusion (Hf) are determined from the second heating step.

h) Tensile Modulus and Tensile Properties

Tensile properties are measured at 23° C. according to ISO 527-1 with a specimen Type 1A, at cross head speed 1 mm/min. Test specimens were notched out of the sheets as per Type 1A dimensions and compression molded sheets of thickness 4.0 mm was prepared according to ISO 1872-2 at molding temperature of 180° C. Material was pre-heated by applying light contact pressure for 5 min. Then full pressure was applied for 5 min, after which material was cooled with a cooling rate of 15° C./min and demolding temperature was 40° C.

i) Flexural Modulus

The flexural modulus is determined according to ISO 178. The test specimens having a dimension of 80×10×4.0 mm³ (length×width×thickness) and was cut from ISO 527-1 Type 1A prepared by compression moulding according to EN ISO 1872-2. The specimens are conditioned at 23° C. and 50% relative humidity. The length of the span between the supports is 64 mm and the test speed is 2 mm/min.

j) Environmental Stress Crack Resistance (ESCR)

ESCR was conducted according to ASTM D 1693 (50° C., 10% Igepal C0630). Test specimens according to ASTM D 1693 condition B were prepared through compression molding of sheets of thickness 1.90±0.06 mm. Compression molding was done according to ISO 1872-2 at molding temperature of 180° C. Material was pre-heated by applying light contact pressure for 5 min. Then full pressure was applied for 5 min, after which material was cooled with a cooling rate of 15° C./min. Demolding temperature was 40° C. The specimens (38.0±2.5 mm×13±0.8 mm) were cut out of the sheets, and notched according to ASTM D 1693, condition B.

k) Tensile Properties of Films

Film tensile properties are measured at 23° C. according to ISO 527-3 with a specimen Type 2 using 25 m thick blown film. Tensile modulus in machine direction (TM-MD) and Tensile modulus in transverse direction (TM-TD) were measured as 1% secant modulus with 5 mm/min test speed and 50 mm gauge length according to ASTM D882.

Tensile strength at break (TSB-MD and TSB-TD), Tensile strength at yield (TSY-MD and TSY-TD), Elongation at break (EB-MD), Elongation at yield (EY-MD and EY-TD) were measured according to ISO 527-3 specimen Type 2 with 50 mm gauge length and 500 mm/min test speed.

l) Tear Strength

Tear testing is conducted according to ASTM 1922 on 25 μm blown films. The Elmendorf tear strength is the force in Newton required to propagate tearing across a film specimen. It is measured using a precisely calibrated pendulum device. Acting by gravity, the pendulum swings through an arc, tearing the specimen from a precut slit. The specimen is held on one side by the pendulum and on the other side by a stationary member. The loss in energy by the pendulum is indicated by a pointer. The scale indication is a function of the force required to tear the specimen. The selection of pendulum weight was based on the absorb energy of the specimen, preferred between 20-80% of pendulum capacity. There is no direct linear relationship between tearing force and specimen thickness. Therefore only data obtained at the same thickness range should be compared.

m) Puncture Resistance

Protrusion Puncture Resistance testing is conducted according to ASTM D5748 on 25 μm blown films. This test method determines the resistance of a film sample to the penetration of a probe with specific size of 19 mm diameter pear-shaped TFE fluorocarbon coated at a standard low rate, a single test velocity (250 mm/min). Performed at standard conditions, the test method imparts a biaxial stress loading. Cut the film specimens 150 mm×150 mm to fit into the jig and conditioning done at 23±2° C. at 50±5% relative humidity.

The Puncture Resistance Force (N) is the maximum force or highest force observed during the test and Puncture Resistance Energy (J) is the energy used until the probe breaks the test specimen, both are measured using the high accuracy 500N loadcell and crosshead position sensor.

n) Water Vapor Transmission Rate (WVTR)

Moisture barrier property, i.e. water vapour transmission rate, is determined on blown films having a thickness of 25 μm. The specimen is mounted as a sealed semi-barrier between two chambers at ambient atmospheric pressure. The edges of the test cell are tightly sealed to prevent outside air from leaking into the cell. Water vapor (in the form of humidified air) is continuously admitted to the upper half of the test cell. Water vapor is supplied with HPLC-grade water in the humidity generator. Nitrogen is continuously admitted to the lower half of the test cell. Before entering the module, the nitrogen passes through an in-line molecular sieve desiccant. This helps ensure that the nitrogen gas does not contain any water vapor that might affect transmission rate data. As water vapor permeates the film sample, it is picked up by the nitrogen gas and carried through a modulated infrared sensor. The sensor electronics generate a voltage that is directly proportional to the amount of water vapor passing through the sensor. The water vapor transmission rate test is performed as per ASTM F1249:2006 and ISO15106-2:2003, at 37.8° C. and 90% relative humidity (RH) and at 37.8° C. and 100% relative humidity (RH), with using 10 sccm of $N_2$ gas as a carrier and a film surface area of 10 $cm^2$.

o) Oxygen Transmission Rate (OTR)

Oxygen barrier property, i.e. oxygen transmission rate, is determined on blown films having a thickness of 25 μm. The specimen is mounted as a sealed semi-barrier between two chambers at ambient atmospheric pressure. One chamber is slowly purged by a stream of nitrogen and hydrogen gas mixture (2% $H_2$ in $N_2$) at a given temperature and relative humidity and the other chamber is purged by a stream of oxygen at the same temperature and relative humidity as the $N_2$ stream. As oxygen gas permeates through the film into the nitrogen carrier gas, it is transported to the coulometric detector where it produces an electrical current, the magnitude of which is proportional to the amount of oxygen flowing into the detector per unit time. The oxygen transmission rate test is performed as per ASTM D 3985, at 23° C. and 0% relative humidity, with using 10 sccm of $N_2/H_2$ and 02 (99.999%) gases and a film surface area of 1 $cm^2$.

p) Gel Content

The gel content is determined on 70 microns film made from the running cast film extrusion line using special camera and data processor that detects and quantify film defects including gels of various size groups. Gels size groups are: 100-300 μm, 301-600 μm, 601-1000 μm, >1000 μm. The gel count expressed in pieces per square meter is derived from the number of gels on each size group detected from the total scanned area of the film. The edge or side beads of the cast film is not taken for measurement due to its higher thickness than those zones in the middle of the film web. Gel test time takes 30 minutes after completion of the purging of the cast film line.

2. Examples a) Catalyst

The polymerization catalyst for polymerizing inventive example IE1 was prepared according to example 1 of EP 1 378 528 A1.

b) Polymerization of Inventive Example IE1

In a prepolymerization stage a first loop reactor having a volume of 50 $dm^3$ was operated at 70° C. and 64 bar pressure. For producing a prepolymerization fraction 2 kg/h ethylene, and 2 g/h of hydrogen were added. In addition, the polymerization catalyst prepared according to the description above was introduced into the reactor at a rate of 11 g/h and triethylaluminium (TEA) cocatalyst was introduced into the reactor at a rate of 22 g/h. The conditions in the reactor as shown in Table 1.

The polymer slurry was withdrawn from the first loop reactor and transferred into a loop reactor having a volume of 500 $dm^3$. This second loop reactor was operated at 95° C. and 64 bar pressure. Into the reactor were introduced ethylene and hydrogen so that the ratio of hydrogen to ethylene (H2/C2) in the reactor was 456 mol/kmol. No additional catalyst feed or comonomer feed was introduced into the reactor. The conditions in the reactor as shown in Table 1.

The polymer slurry was withdrawn from the second loop reactor and transferred into a flash vessel operated at 3 bar pressure and 70° C. temperature where the hydrocarbons were substantially removed from the polymer. The polymer was then introduced into a gas phase reactor operated at a temperature of 85° C. and a pressure of 20 bar. In addition ethylene, 1-butene and hydrogen were introduced into the reactor so that the ratio of hydrogen to ethylene (H2/C2) in the reactor was 110 mol/kmol and the ratio of 1-butene to ethylene (C4/C2) in the reactor was 18.8 mol/kmol. The conditions are shown in Table 1.

The resulting polymer was purged with nitrogen (about 50 kg/h) for one hour, stabilised with 1000 ppm of Irganox 1010 and Irgafos 168 and 1000 ppm Ca-stearate and then extruded to pellets in a counter-rotating twin screw extruder CIM90P (manufactured by Japan Steel Works) so that the throughput was 223 kg/h and the screw speed was 323 rpm.

TABLE 1

Polymerization conditions of inventive example IE1

|  |  | IE1 |
|---|---|---|
| Prepolymeriser: |  |  |
| Temperature | ° C. | 70 |
| Pressure | bar | 64 |
| Split | wt-% | 1.6 |
| Loop: |  |  |
| Temperature | ° C. | 95 |
| Pressure | bar | 64 |
| H2/C2 | mol/kmol | 456 |
| C2-concentration | mol % | 2.8 |
| Production rate | kg/h | 37.6 |
| Split | wt-% | 43.4 |
| MFR$_2$ | g/10 min | 280 |
| Density | kg/m$^3$ | 972 |
| Mw | g/mol | 26750 |
| Mn | g/mol | 5050 |
| Mz | g/mol | 173900 |
| Mw/Mn |  | 5.3 |
| Mz/Mw |  | 6.5 |
| Gas phase: |  |  |
| Temperature | ° C. | 85 |
| Pressure | bar | 20 |
| H2/C2 | mol/kmol | 110 |
| C4/C2 | mol/kmol | 18.8 |
| C2-concentration | mol % | 15 |
| C4-concentration | mol % | 0.4 |
| Production rate | kg/h | 46 |
| Split | wt-% | 55 |
| Density (HMW component) | kg/m$^3$ | 947.5 |
| MFR$_2$ (HMW component, calc) | g/10 min | 0.003-0.012 |
| Density (base resin) | kg/m$^3$ | 959.5 |
| MFR$_2$ (base resin) | g/10 min | 0.70 | c) Comparative Examples CE1 and CE2

CE1 is a unimodal HDPE resin having a density of 961 kg/m$^3$ and a melt flow rate MFR$_2$ (190° C., 2.16 kg) of 0.7 g/10 min, produced in a Unipol gas phase polymerization process, commercially available from Exxon Mobil as HTA108/SABIC as HD04660.

CE2 is a unimodal HDPE resin having a density of 955 kg/m$^3$ and a melt flow rate MFR$_2$ (190° C., 2.16 kg) of 1.1 g/10 min, produced in a gas phase polymerization process, commercially available from Hanwha/TOTAL as F920A.

d) Properties of the Polyethylene Compositions of IE1, CE1 and CE2

The polyethylene compositions of examples IE1, CE11 and CE2 have properties as shown in Table 2 below.

Figure 2:
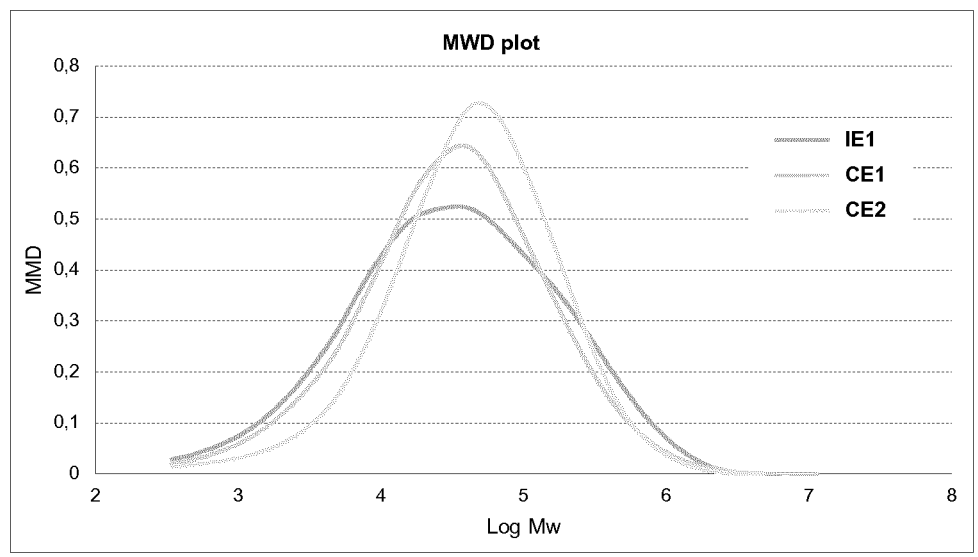
FIG. 2 shows the GPC curves shown as molecular weight distribution over log Mw of the examples IE1, CE1 and CE2.

The rheological frequency sweep curves of IE1, CE1 and CE2 are shown in FIG. 1 and the GPC curves of IE1, CE1 and CE2 are shown in FIG. 2.

TABLE 2

Properties of the polyethylene compositions of IE1, CE1 and CE2

|  |  | CE1 | CE2 | IE1 |
|---|---|---|---|---|
| Density | kg/m$^3$ | 960.4 | 955.1 | 959.5 |
| MFR$_2$ | g/10 min | 0.74 | 1.13 | 0.70 |
| MFR$_5$ | g/10 min | 3.00 | 3.11 | 2.46 |
| MFR$_{21}$ | g/10 min | 49.7 | 30.1 | 43.0 |
| FRR$_{21/5}$ |  | 16.6 | 9.7 | 17.5 |
| FRR$_{21/2}$ |  | 67.2 | 26.6 | 61.4 |
| Tm | ° C. | 132.9 | 132.8 | 132.1 |
| delta Hm | J/g | 222 | 208 | 221 |
| Tc | ° C. | 120.8 | 120.0 | 119.6 |
| delta Hc | J/g | 218 | 209 | 216 |
| Mn | kg/mol | 9.6 | 14.1 | 8.1 |
| Mw | kg/mol | 92.5 | 98.1 | 110.3 |
| Mz | kg/mol | 584.2 | 381.1 | 517.4 |
| Mw/Mn |  | 9.6 | 7.0 | 13.6 |
| Mz/Mw |  | 6.3 | 3.9 | 4.7 |
| eta$_{747}$ | kPa · s | 34 | 10 | 20 |
| eta$_{0.05}$ | Pa · s | 24062 | 9740 | 18067 |
| eta$_{300}$ | Pa · s | 673 | 1031 | 785 |
| SHI$_{2.7/210}$ |  | 27.2 | 5.3 | 16.0 |
| SHI$_{5/200}$ |  | 19.2 | 4.7 | 12.9 |
| ESCR, F50 (10% Igepal) | H | 12 | 18 | 110 |
| Tensile stress at yield | MPa | 30.1 | 28.3 | 29.9 |
| Tensile strain at yield | % | 8.1 | 9.1 | 8.2 |
| Tensile modulus | MPa | 1420 | 1230 | 1370 |
| Flexural modulus | MPa | 1530 | 1410 | 1480 |

The polyethylene composition of inventive example IE1 shows an improved ESCR at comparable tensile properties when compared to the polyethylene compositions of CE1 and CE2, thus showing a superior ESCR/stiffness balance.

e) Properties of Cast and Blown Films of IE1, CE1 and CE2

The compositions of examples IE1, CE1 and CE2 were cast into mono-layer cast films with a thickness of 70 µm using a OCS cast film line. The cast films were examined regarding their gel content.

The processing conditions and gel content are shown in Table 3 below.

TABLE 3

Processing conditions and properties of the cast films of IE1, CE1 and CE2

|  |  | CE1 | CE2 | IE1 |
|---|---|---|---|---|
| Processing conditions |  |  |  |  |
| Torque | Nm | 37 | 47 | 40 |
| Melt pressure | bar | 110 | 152 | 140 |
| Melt temperature | ° C. | 241 | 214 | 241 |
| Gel content |  |  |  |  |
| Gels 100-300 µm | pcs/m$^2$ | 413.7 | 177.6 | 78.7 |
| Gels 301-600 µm | pcs/m$^2$ | 21.3 | 11.4 | 15.9 |
| Gels 601-1000 µm | pcs/m$^2$ | 1 | 0.3 | 0.8 |
| Gels >1000 µm | pcs/m$^2$ | 0.14 | 0 | 0 |

The cast film of inventive example IE1 shows a significantly lower amount of gels compared to the cast films of CE1 and CE2, thus indicating an improved homogeneity.

The compositions of examples IE1, CE1 and CE2 were blown into mono-layer blown films with a thickness of 25 µm using a large scale Reifenhauser blown film line. The blown films were examined regarding their mechanical and barrier properties.

The processing conditions and properties are shown in Table 4 below.

TABLE 4

Processing conditions and properties of the blown films of IE1, CE1 and CE2

|  |  | CE1 | CE2 | IE1 |
|---|---|---|---|---|
| Processing conditions |  |  |  |  |
| Motor load | Amp | 115 | 117 | 119 |
| Melt pressure | bar | 270 | 319 | 307 |
| Melt temperature | °C. | 198 | 215 | 201 |
| Film Properties |  |  |  |  |
| TM-MD (1% secant) | MPa | 1240 | 860 | 1110 |
| TM-TD (1% secant) | MPa | 1700 | 1060 | 1650 |
| TSB-MD | MPa | 67.8 | 43.8 | 74.1 |
| TSB-TD | MPa | 33.1 | 40.8 | 38.5 |
| EB-MD | % | 560 | 530 | 500 |
| TSY-MD | MPa | 35.3 | 27.2 | 32.3 |
| TSY-TD | MPa | 37.1 | 30.9 | 39.9 |
| EY-MD | % | 5.5 | 6.0 | 5.6 |
| EY-TD | % | 2.5 | 5.3 | 2.6 |
| TS-MD | N | 0.1 | 0.3 | 0.13 |
| TS-TD | N | 9.3 | 2.7 | 11.5 |
| PR-F | N | 35.9 | 25.8 | 34.4 |
| PR-E | J | 0.73 | 0.38 | 0.76 |
| WVTR - 100% RH | g/m$^2$/day | 9.1 | 6.5 | 8.4 |
| WVTR - 90% RH | g/m$^2$/day | 7.5 | 5.5 | 6.7 |
| OTR | cm$^3$/m$^2$/day | 2940 | 1850 | 2630 |

Inventive example IE1 shows good processability when producing a cast film and a blown film as can be seen in the accordant melt pressures and bubble stability during blown film extrusion.

Further, inventive example IE1 shows good mechanical and barrier properties.

Comparing all properties inventive example IE1 shows an improved balance of properties in regard of stiffness, ESCR, homogeneity mechanical properties and barrier properties.

The invention claimed is:

1. A polyethylene composition comprising a base resin comprising:
   a low molecular weight ethylene polymer component and a high molecular weight ethylene polymer component, wherein the high molecular weight ethylene polymer component has a higher weight average molecular weight than the low molecular weight ethylene polymer component,
   wherein the base resin has a density of at least 958.0 kg/m$^3$,
   and the polyethylene composition has a melt flow rate MFR$_2$ (190° C., 2.16 kg) of from 0.50 to 0.80 g/10 min, and a melt flow rate MFR$_{21}$ (190° C., 21.6 kg) of from 32 to 48 g/10 min and a molecular weight distribution being the ratio of the weight average molecular weight and the number average molecular weight, Mw/Mn, of from 10.0 to 15.0.

2. The polyethylene composition according to claim 1, wherein the low molecular weight ethylene polymer component is a low molecular weight ethylene homopolymer component and the high molecular weight ethylene polymer component is a high molecular weight ethylene copolymer component comprising comonomer units selected from at least one alpha-olefin having from 4 to 8 carbon atoms.

3. The polyethylene composition according to claim 2, wherein the comonomer units are selected from 1-butene and 1-hexene.

4. The polyethylene composition according to claim 1, wherein the weight ratio between the low molecular weight ethylene polymer component and the high molecular weight ethylene polymer component in the base resin is in the range of from 40:60 to 48:52.

5. The polyethylene composition according to claim 1, having at least one of the following properties: a melt flow rate MFR$_5$ (190° C., 5 kg) of from 2.0 to 3.5 g/10 min and a flow rate ratio being the ratio of MFR$_{21}$/MFR$_5$ of from 10 to 25.

6. The polyethylene composition according to claim 1, having at least one of the following properties: a weight average molecular weight Mw of from 90 to 130 kg/mol, a number average molecular weight Mn of from 7 to 10 kg/mol and a z average molecular weight Mz of from 400 to 800 kg/mol.

7. The polyethylene composition according to claim 1, having a number average molecular weight Mn of from 7.5 to 9.5 kg/mol.

8. The polyethylene composition according to claim 1, having a weight average molecular weight Mw of from 95 to 125 kg/mol.

9. The polyethylene composition according to claim 1, having at least one of the following properties: a shear thinning index SHI$_{5/200}$ of from 8 to 18, a shear thinning index SHI$_{2.7/210}$ of from 10 to 20, a dynamic viscosity eta$_{0.05}$ of from 10000 to 25000 Pa·s, a dynamic viscosity eta$_{300}$ of from 500 to 1000 Pa·s and a viscosity at a constant shear stress of 747 Pa, eta$_{747}$, of from 10000 to 30000 Pa·s.

10. The polyethylene composition according to claim 1, having at least one of the following properties: a tensile stress at yield of from 26 to 32 MPa, a tensile strain at yield of from 7 to 10% and a flexural modulus of from 1200 to 1800 MPa.

11. The polyethylene composition according to claim 1, having an environmental stress crack resistance (F50, 10% Igepal) of at least 72 hours.

12. A process for producing a polyethylene composition according to claim 1, comprising the steps of:
   a) polymerizing ethylene in the presence of a polymerization catalyst in a first polymerization reactor for producing a first intermediate material comprising the low molecular weight ethylene polymer component;
   b) transferring the first intermediate material into a second polymerization reactor;
   c) polymerizing ethylene and at least one comonomer selected from alpha-olefins having from 4 to 8 carbon atoms in the presence of the first intermediate material for producing a base resin comprising the low molecular weight ethylene polymer component and the high molecular weight ethylene polymer component;
   d) compounding the base resin to obtain the polyethylene composition.

13. An article comprising the polyethylene composition according to claim 1.

14. The article according to claim 13 being a film or a blow molded article.

15. The article according to claim 14 being a blown film, a cast film or at least one layer of a multi-layered film.

16. The article according to claim 14 being a film with at least one of the following properties:
   tensile modulus in machine direction (TM-MD) and in transverse direction (TM-MD) both of at least 1000 MPa;
   elongation at break in machine direction (EB-MD) of at least 400%;
   elmendorf Tear Strength in transverse direction (ETS-TD) of at least 6.5 N;
   puncture resistance energy of at least 0.50 J;

water vapour transmission rate at 100% RH of not more than 10 g/m$^2$/day;

oxygen transmission rate of not more than 3100 cm$^3$/m$^2$/day; and not more than 35 gels/m$^2$ of 301-600 μm diameter and not more than 140 gels/m$^2$ of 100-300 μm diameter.

* * * * *